United States Patent [19]

Beck

[11] 4,115,912
[45] Sep. 26, 1978

[54] METHOD OF AND ASSEMBLY FOR FASTENING OBJECTS ON A SUPPORT MATERIAL

[75] Inventor: Franz Beck, Schaan, Liechtenstein

[73] Assignee: Hilti Aktiengesellschaft, Schaan, Liechtenstein

[21] Appl. No.: 760,025

[22] Filed: Jan. 17, 1977

[51] Int. Cl.² .................... B23P 11/00; F16B 15/00
[52] U.S. Cl. ................ 29/432; 29/526 R; 85/10 E; 85/50 R
[58] Field of Search ............ 85/1 JP, 10 E, 10 R, 85/50 R, 28; 248/216.1, 216.2, 216.3, 358 R; 29/432, 526

[56] References Cited

U.S. PATENT DOCUMENTS

| | | | |
|---|---|---|---|
| 1,795,308 | 3/1931 | LaHodny | 85/1 JP |
| 2,666,252 | 1/1954 | Temple | 29/432 |
| 2,675,607 | 4/1954 | Catlin | 85/10 E |
| 3,159,391 | 12/1964 | Wilfert et al. | 248/358 R |
| 3,299,766 | 1/1967 | Gould et al. | 85/50 R |
| 3,429,013 | 2/1969 | Pabich et al. | 29/432 |
| 3,517,903 | 6/1970 | Gutshall | 85/50 R |
| 3,585,894 | 6/1971 | Brown | 85/1 JP |
| 3,670,618 | 6/1972 | Jellison | 85/1 JP |
| 3,803,972 | 4/1974 | Deutscher | 85/1 JP |
| 3,841,474 | 10/1974 | Maier | 85/10 E |

FOREIGN PATENT DOCUMENTS

| | | | |
|---|---|---|---|
| 1,566,657 | 3/1969 | France | 85/10 E |
| 2,433,174 | 1/1976 | Fed. Rep. of Germany | 29/432 |
| 2,421,937 | 5/1975 | Fed. Rep. of Germany | 85/10 E |
| 1,603,836 | 8/1971 | Fed. Rep. of Germany | 29/432 |

Primary Examiner—Marion Parsons, Jr.
Attorney, Agent, or Firm—Toren, McGeady and Stanger

[57] ABSTRACT

A fastening element assembly includes a fastening element having a head and an axially extending shank, a ring-shaped elastic member laterally enclosing at least an axial part of the shank, and a washer located on the shank between the elastic member and the head. The elastic member can be in contact with the surface of the shank or spaced radially outwardly from it. When using the assembly to attach an object to a support material, an opening or hole is formed in the object with the opening having a diameter approximately the same size as the outside diameter of the elastic member. The fastening element assembly is driven through the opening in the object into the support material so that the elastic member seats in the opening and spaces the shank from the object. Any transverse forces acting on the object are damped by the elastic member before they reach the shank.

4 Claims, 3 Drawing Figures

METHOD OF AND ASSEMBLY FOR FASTENING OBJECTS ON A SUPPORT MATERIAL

SUMMARY OF THE INVENTION

The present invention is directed to a fastening element assembly and to the method of attaching an object to support material using the fastening element assembly. The fastening element of the assembly is driven into the support material by an explosive powder charge operated setting device and a ring-shaped elastic member is provided on the shank of the fastening element and the member can be in direct contact with the shank or spaced radially outwardly from it.

Fastening elements used to attach objects to usually hard support material are exposed to different loads or forces. Particularly troublesome are forces which act on the fastening element transversely of its axis. Such forces may be caused, for example, by vibrations, and by the action of heat or the like to which the object being secured is exposed. These transversely acting forces may be such that the fastening element is bent or even sheared off with the fastening being reduced or rendered ineffective.

Therefore, it is the object of the present invention to provide a method of attaching objects to a support material so that the fastening element attaching the object is protected, at least to some degree, against transversely acting forces. Another object is to provide a fastening element assembly useful in carrying out the method.

In accordance with the present invention, a fastening element, at least partially laterally enclosed by a ring-shaped elastic member, is driven into the support material through a cutout or opening provided in the object to be attached. The shape of the opening corresponds substantially to the outside contour or diameter of the elastic member. Using the method of the present invention it is possible to secure objects of any kind to a support material. The method of the invention is applicable for attaching many different types of objects to a support, for example, in attaching machine or apparatus parts, coverings, facings, beam constructions and the like to a support member. Determining the selection of a fastening member in accordance with the present invention is motivated basically by the occurrence of forces acting on the fastening element transversely of its axial direction. Such forces, undesired in a fastening of the conventional kind, are damped by a ring-shaped elastic member in accordance with the present invention. The ring-shaped elastic member is merely deformed by the transversely acting forces and affords an elimination of or at least a reduction in the forces acting transversely of the fastening element. As a result, the fastening element is not stressed, or at least the amount of stressing is reduced, thereby avoiding destruction of the elements due to its being bent or sheared off.

To provide the optimum compensation for the transversely acting forces, it is expedient to adapt the dimensions of the elastic ring to the particular fastening problem experienced. Accordingly, since the dimensions of the fastening element depend on the type of fastening or attachment to be effected, adaptation of the ring-shaped elastic member for a particular fastening element has proved to be successful where the radial dimension of the member is about one to five times the shank diameter of the fastening element. If the elastic member has a circular cross section, that is, in the radial direction of the member, the diameter of the cross-section amounts to about one to five times the shank diameter.

To absorb the axial forces developed when the fastening element is driven into the support material, a metal washer is positioned on the shank between the head of the fastening element and the elastic member. The outside diameter of the washer is greater than the outside diameter of the elastic member so that it extends outwardly beyond the outer circumferential periphery of the member. As a result, if excess energy is supplied in driving in the fastening element, the elastic member is not contacted by the head of the fastening element. Moreover, the metal washer preferably used in the fastening element assembly, improves the guidance of the fastening element as it is driven into the support material.

To avoid the use of separate means for holding the ring-shaped elastic member on the fastening element, the member may laterally enclose at least an axially extending portion of the fastening element shank, such as in the form of a sleeve. The elastic member can be mounted on the fastening element by self-retention, that is, the inside diameter of the member can be made slightly smaller than the shank diameter.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
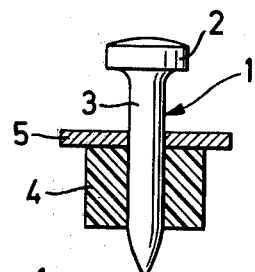
FIG. 1 shows a fastening element assembly, partly in section, embodying the present invention.

In FIG. 1 a fastening element assembly is illustrated including a fastening element 1 having a head 2 and an axially elongated shank 3 extending from the head. Laterally enclosing an axial portion of the shank is a ring-shaped elastic member 4 which can be formed of rubber, plastic or the like. A metal washer laterally encloses the shank and is positioned on the shank between the head 2 and the adjacent end of the elastic member 4. The metal washer 5 may be arranged on the shank in a self-supporting or loose manner, or it is possible to attach it to the elastic member by vulcanization or by using an adhesive material.

Figure 2:
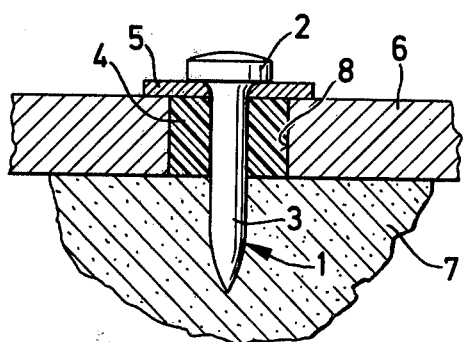
FIG. 2, illustrates the fastening element assembly of FIG. 1 secured to a support material in accordance with the method of the present invention.

In FIG. 2 the fastening element assembly is shown attaching a fishplate type object 6 to a support material 7, such as metal, masonry, rock or the like. Object 6 contains a cutout or opening 8 therethrough having a surface contour corresponding substantially to the outer contour of the elastic member 4. As indicated in FIG. 2, after the object has been attached, the opening 8 is completely filled by the ring-shaped member 4. Any stresses acting through the object transversely of the axial direction of the fastening element 1 are not transmitted directly to the fastening element by the object, rather they are damped by the member 4 which deforms under the action of such forces. The washer 5 located between the head 2 and the elastic member 4 serves to absorb any excess energy generated in inserting the fastening element into the support material. Further, in addition to its function in the fastening operation, the washer protects the elastic member 4 from being overstressed by the head 2 as the fastening element is driven in.

Figure 3:
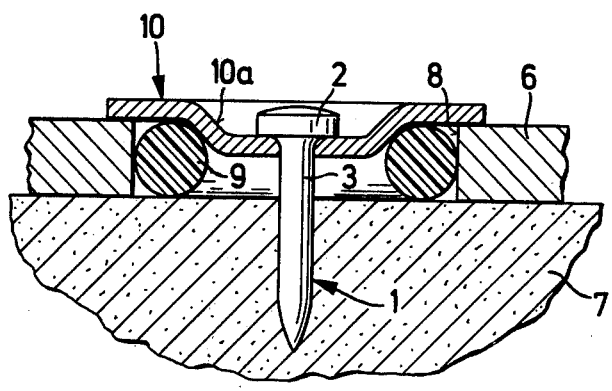
FIG. 3 is another embodiment of a fastening element assembly in accordance with the present invention used in carrying out the method of the invention.

In FIG. 3 another embodiment of the fastening element assembly is illustrated where it has secured a fishplate type object 6 to a support material 7. The object 6 has a cutout or opening 8 shaped to correspond substantially to the outer contour of the ring-shaped elastic member 9 which has a circular cross-section. In this embodiment, the elastic member is not in direct contact with the shank 3 of the fastening element 1, rather it is guided by the surface of the washer 10 at the junction between the planar portion of the washer contacting the object and a projecting portion of the washer formed by a recess 10a in the outwardly facing surface of the washer. As can be seen in FIG. 3, the outwardly facing surface of the washer is recessed and the inwardly facing surface of the washer projects outwardly. The head 2 of the fastening element seats within the recess 10a. In this embodiment, the outside diameter of the washer is greater than the outside diameter of the elastic member 9 so that the member 9 is not damaged because of any excessive axial forces generated in driving the fastening element. As mentioned above, the elastic member can be adhered to the washer, since it is not in direct contact with the shank 3 of the fastening element.

While specific embodiments of the invention have been shown and described in detail to illustrate the application of the inventive principles, it will be understood that the invention may be embodied otherwise without departing from such principles.

What is claimed is:

1. A method of attaching objects to a support material by means of fastening elements having a head and a shank extending axially from the head with the head having a greater diameter than the shank, which fastening elements are driven into the support material by an explosive powder charge operating setting device, comprising the steps of laterally enclosing the shank of the fastening element with a ring-shaped elastic member having a dimension between its inside diameter and outside diameter in the range of one to five times the diameter of the shank of the fastening element, forming an opening in the object to be attached with the opening having a diameter and shape corresponding substantially to the outside diameter and contour of the elastic member, driving the fastening element by means of an explosive powder charge into the support material and seating the elastic member within the opening in the object for attaching the object to the support material and separating the object from the shank of the fastening element by means of the elastic member so that the forces acting through the object transverse to the axial direction of the fastening elements are at least damped by the elastic member, separating the head of the fastening element from the elastic member with a metal washer having an outside diameter greater than the outside diameter of the elastic member, and placing the elastic member in spaced relationship with the shank of the fastening element.

2. A method, as set forth in claim 1, wherein the step of laterally enclosing the shank with the elastic member comprises laterally enclosing the shank for at least a part of the axial length thereof.

3. A fastening element assembly, comprising a fastening element of the type inserted into a receiving material by an explosive powder charge operated setting device and having a head at one end and an axially elongated shank extending from the head, said head having an outside diameter greater than the diameter of said shank, a ring-shaped elastic member laterally enclosing at least a part of the axial length of said shank and said elastic member having an inside diameter and an outside diameter, said shank of said fastening element having an axial length greater than the axial dimension of said elastic member, a washer located about said shank and positioned between said head and said elastic member, said washer having an outside diameter greater than the outside diameter of said elastic member and said elastic member having a dimension extending radially between the inside and outside diameters thereof which is one to five times greater than the diameter of said shank and which affords at least a dampening effect on forces acting transversely of the axial direction of said fastening element, the inside diameter of said elastic member is greater than the diameter of said shank so that said inside diameter of said elastic member is spaced radially outwardly from said shank, said washer having a first surface facing toward said head and an oppositely directed second surface facing away from said head and the first surface having a centrally disposed recessed portion laterally surrounding the head and an annular planar portion laterally surrounding the recessed portion, said second surface of said washer having a projecting portion opposite the recessed portion of said first surface and an annular planar portion laterally surrounding said projecting portion, and said elastic member being located in surface contact with the second surface of said washer at the junction of said projecting part and said annular portion thereof.

4. A fastening element assembly, as set forth in claim 3, wherein said elastic member is adhesively secured to said washer.

* * * * *